(12) United States Patent
Arvie, Jr. et al.

(10) Patent No.: US 8,584,760 B2
(45) Date of Patent: Nov. 19, 2013

(54) CLEANING AGENTS FOR WELLBORE CLEANING AND METHODS OF USE THEREOF

(75) Inventors: Morris Arvie, Jr., Houston, TX (US); Shaohua Lu, Houston, TX (US); Eugene Dakin, Langdon, CA (US)

(73) Assignee: M-I L.L.C., Houston, TX (US)

( * ) Notice: Subject to any disclaimer, the term of this patent is extended or adjusted under 35 U.S.C. 154(b) by 112 days.

(21) Appl. No.: 13/144,002

(22) PCT Filed: Jan. 8, 2010

(86) PCT No.: PCT/US2010/020407
§ 371 (c)(1),
(2), (4) Date: Jul. 11, 2011

(87) PCT Pub. No.: WO2010/083093
PCT Pub. Date: Jul. 22, 2010

(65) Prior Publication Data
US 2011/0272160 A1    Nov. 10, 2011

Related U.S. Application Data

(60) Provisional application No. 61/148,878, filed on Jan. 15, 2009.

(51) Int. Cl.
*E21B 37/00*    (2006.01)

(52) U.S. Cl.
USPC .............................................. 166/312

(58) Field of Classification Search
USPC ............................................... 166/311, 312
See application file for complete search history.

(56) References Cited

U.S. PATENT DOCUMENTS

| | | | |
|---|---|---|---|
| 4,780,234 A | 10/1988 | Malik et al. | |
| 5,374,361 A | 12/1994 | Chan | |
| 5,678,631 A | 10/1997 | Salisbury et al. | |
| 5,904,208 A | 5/1999 | Ray et al. | |
| 6,063,737 A | 5/2000 | Haberman et al. | |
| 6,196,320 B1 | 3/2001 | Ray et al. | |
| 6,534,449 B1 | 3/2003 | Gilmour et al. | |
| 2003/0166472 A1 | 9/2003 | Pursley et al. | |
| 2006/0166837 A1 | 7/2006 | Lin et al. | |
| 2006/0258541 A1 | 11/2006 | Crews | |
| 2007/0111896 A1* | 5/2007 | Knox et al. | 507/209 |
| 2009/0008091 A1 | 1/2009 | Quintero et al. | |

FOREIGN PATENT DOCUMENTS

EP    1273756 A1    1/2003
WO    2004/044378 A1    5/2004

OTHER PUBLICATIONS

Office Action for European Application No. 10731962.6 dated Nov. 6, 2012 (11 pages).
International Search Report issued in PCT/US2010/020407, mailed on Aug. 6, 2010, 3 pages.
Written Opinion issued in PCT/US2010/020407, mailed on Aug. 6, 2010, 4 pages.
Office Action for Chinese Application No. 201080004448.0 dated Dec. 3, 2012, with English translation thereof (13 pages).
Office Action issued in corresponding Australian Application No. 2010204964 dated Jul. 13, 2012 (3 pages).
Office Action issued in corresponding Canadian Application No. 2,749,844 dated Jul. 19, 2012 (3 pages).
Office Action for Eurasian Application No. 201170923/28 dated Dec. 28, 2012 (4 pages).
Communication pursuant to Article 94(3) EPC issued Jun. 25, 2013 in corresponding European applicaiton No. 10 731 962.6 (4 pages).
Second Office Action, including English Translation, issued in corresponding Chinese Application No. 201080004448.0 dated May 22, 2013 (6 pages).
Office Action (with translation) issued Jul. 9, 2013 in Eurasian Application No. 201170923 (2 pages).

* cited by examiner

*Primary Examiner* — William P Neuder
(74) *Attorney, Agent, or Firm* — Osha • Liang LLP

(57) ABSTRACT

A method of cleaning walls of a wellbore that includes contacting the walls with a cleaning fluid, the cleaning fluid comprising: a base fluid comprising a blend of a base oil and at least one of a mutual solvent or a terpene; and an alkyl glycoside is disclosed herein.

22 Claims, No Drawings

CLEANING AGENTS FOR WELLBORE CLEANING AND METHODS OF USE THEREOF

BACKGROUND OF INVENTION

1. Field of the Invention

Embodiments disclosed herein relate generally to methods cleaning wellbores. In particular, embodiments disclosed herein relate to cleaning fluids capable of cleaning wellbores.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Often drilling of a well is begun with a water-based fluid. However, as drilling depth increases, formation pressures and heat increase, and these conditions necessitate use of a second fluid, often an oil-based fluid. During the replacement (displacement) of one fluid for another, spacer fluids and/or displacement fluids are used to provide a physical barrier between the old and new fluid, and also service to clean the well of residuals of the old fluid. In open hole wells, upon drilling to a total depth, the oil-based fluid must be removed from the wellbore, and the wellbore prepared for production, namely by cleaning the well of residual fluid, removing filtercake, and installing completion equipment.

In cased holes, upon drilling a predetermined length successfully, the wellbore may typically prepared for its completions phase by isolating formations transversed by the wellbore with a casing string or liner. Specifically, the bit and drill string are removed from the well, and a larger diameter string of casing or liner is inserted and secured therein with cement. The casing also insures permanence of the borehole and prevents entry of formation fluid into the wellbore, other than from the formation that is being produced. Similar to open hole wells, the casing must be cleansed to remove residual fluid from the walls.

Before the well can be completed and put into production, it is necessary to clean the wellbore and replace the fluids present in the wellbore with a completion fluid such as brine. The cleaning process serves to remove residual fluid build-up on the walls of the wellbore (including the casing or liner), as well as solids present in the well. Furthermore cleaning of the casing wall may also be necessary at intervals during well production to remove accumulated debris and residues, such as oil, paraffin and scale. Debris and residues on the internal walls of the well may have a negative impact on well productivity.

Cleaning of the wellbore typically occurs through the use of spacer fluids and cleaning washes. A spacer is generally characterized as a thickened composition that functions primarily as a fluid piston in displacing fluids present in the wellbore. Frequently, spacers contain an appreciable amount of weighting materials, as well as fluid loss control agents. Cleaning washes or fluids, on the other hand, are generally thin, or relatively non-viscous, fluids that are effective principally as a result of turbulence, dilution, and surfactant action on the residual fluid and filter cake. Cleaning fluids may contain some solids to act as an abrasive, but the solids content is generally significantly lower than in spacers because cleaning fluids are typically too low in viscosity to have good solids carrying capacity. Such cleaning fluids are particularly necessary for the transition between an oil-based wellbore fluid to a water-based wellbore fluid, so that substantially all oily residue on borehole surfaces may be removed.

Accordingly, there exists a continuing need for development of cleaning fluids that can be used in the displacement of wellbore fluids and leaving the borehole surfaces clean.

SUMMARY OF INVENTION

In one aspect, embodiments disclosed herein relate to a method of cleaning walls of a wellbore that includes contacting the walls with a cleaning fluid, the cleaning fluid comprising: a base fluid comprising a blend of a base oil and at least one of a mutual solvent or a terpene; and an alkyl glycoside.

In another aspect, embodiments disclosed herein relate to a method of cleaning a casing in a wellbore having an oil-based fluid contained therein that includes injecting diesel to displace the oil-based fluid; injecting a weighted spacer fluid to displace the diesel; injecting a cleaning fluid to displace the weighted spacer fluid, the cleaning fluid comprising: a base fluid comprising a blend of a base oil and at least one of a mutual solvent or a terpene; and a surfactant at least one alkyl glycoside; and injecting a brine to displace the cleaning fluid.

Other aspects and advantages of the invention will be apparent from the following description and the appended claims.

DETAILED DESCRIPTION

In one aspect, embodiments disclosed herein relate to wellbore fluids used in cleaning borehole surface including casings and liners in wellbores, as well as the methods used therein. More particularly, embodiments disclosed herein relate to use of alkyl glycosides in a base oil to clean fluid residue present on borehole surfaces and/or to render the walls water wet during the transition from an oil-based fluid to a water-based fluid.

While conventional cleaning fluids are water-based fluids, embodiments disclosed herein rely on the use of an oleaginous phase to aid in the cleaning of borehole surfaces. In particular, the cleaning fluids of the present disclosure may be used during the displacement of an oil-based wellbore fluid from the wellbore, during which time the inside of casing strings, tubulars, or other borehole surfaces may be cleaned and converted to water-wet for installation of a water-based fluid. In alternate embodiments, the walls may be cleaned and remain oil-wet, upon transitioning from a first oil-based fluid to a second oil-based fluid.

Cleaning of the borehole surface (and preparation of the surface to become water wet) is achieved through use an alkyl glycoside surfactant. Alkyl glycosides are non-ionic, generally biodegradable surfactants. Glycosides are substituted saccharides in which the substituent group is attached, through an oxygen atom, to the aldehyde or ketone carbon. Accordingly, glycosides are considered acetals. As with the term "saccharide," the term "glycoside" defines neither the number nor the identity of the saccharide units in the molecule. To describe the identity of the saccharide units, it is common to modify the name of the saccharide unit by adding the ending "-side." For example, a glucoside is a glycoside having one or more glucose units and a fructoside is a glycoside having one or more fructose units.

Alkyl glycoside nonionic surfactants used as a cleaning agent in accordance with the present disclosure may have the formula RO—(R'O)$_x$Z$_y$ where the letter O represents an oxygen atom and R, R', x, Z, and y are as described below:

R represents a monovalent alkyl radical containing from 6 to 25 carbon atoms. The term "alkyl radical" is used herein to include aliphatic or alicyclic. In other words, the alkyl radical may be straight-chain or branched, saturated or unsaturated, and may contain carbon, hydrogen, oxygen, etc. In a particular embodiment, the alkyl groups are straight-chain saturated hydrocarbon radicals containing 8 to 16 carbon atoms.

R' represents a divalent alkyl radical containing 2 to 4 carbon atoms where the term "alkyl radical" is used as discussed above. The group (R'O) represents an oxy-alkylene repeating unit derived generally from ethylene oxide, propylene oxide, or butylene oxide.

The letter x represents the number of oxy-alkylene units in the alkyl glycoside, and may vary from 0 to about 12. Oxy-alkylene units may be added to an alcohol prior to reaction with the saccharide (discussed below) as a way to obtain or vary the desired chain length for the alkyl portion of the glycoside.

Z represents a reducing saccharide moiety containing 5 or 6 carbon atoms, and y represents the number of saccharide units in the glycoside. The length of a saccharide chain is commonly described either by adding a descriptive prefix to its name (e.g., monosaccharide, disaccharide, etc.) or by stating the chain's "degree of polymerization" (abbreviated as DP) as a numerical value representing the number of saccharide units bonded together to form a chain. Monosaccharides are polyhydroxy aldehydes and polyhydroxy ketones which, when unsubstituted, have the chemical formula $C_nH_{2n}O_n$. Monosaccharides can join together or polymerize, with the loss of water, to form chains of varying lengths and saccharide units. For example, glucose (also known as dextrose) is a monosaccharide (DP=1); sucrose and maltose are disaccharides (DP=2); and starch and cellulose are polysaccharides having (DP=1000 or more).

Thus, glycosides encompass unsubstituted and substituted molecules of any chain length. such as, for example, glucose, galactose, mannose, xylose, arabinose, fructose, etc. as well as materials which are hydrolyzable to form monosaccharides such as lower alkyl glycosides (e.g. a methyl glycoside, an ethyl glycoside, a propyl glycoside, a butyl glycoside, etc.), oligosaccharides (e.g. sucrose, maltose, maltotriose, lactose, xylobiose, melibiose, cellobiose, raffinose, stachyose, etc.) and other polysaccharides. However, the degree of polymerization affects the surface activity of the glycoside (by increasing the hydrophilic portion of the molecule). Generally, surface activity of an alkyl glycoside is maximized when the hydrophilicity of the saccharide chain balances the lipophilicity of the alkyl chain. Thus, in a particular embodiment in which the alkyl groups have 10 to 16 carbon atoms, the average DP may be selected to range from about 1.0 to 5.0, from about 1.2 to 3.0 in another embodiment, and from about 1.3 to 1.8 in yet another embodiment.

Alkyl glycosides may be prepared by reacting an alcohol of the type and chain length which is desired to form the "alkyl" portion of the glycoside of interest with a saccharide reactant (e.g., a monosaccharide such as glycose, xylose, arabinose, galactose, fructose, etc., or a polysaccharide such as starch, hemicellulose, lactose, maltose, melibiose, etc.) or with a glycoside starting material wherein the aglycone portion thereof is different from the alkyl substituent desired for the ultimate alkyl glycoside product of interest. Typically, such reaction is conducted at an elevated temperature and in the presence of an acid catalyst. An example reaction pathway for formation of an alkyl polyglucoside is shown below:

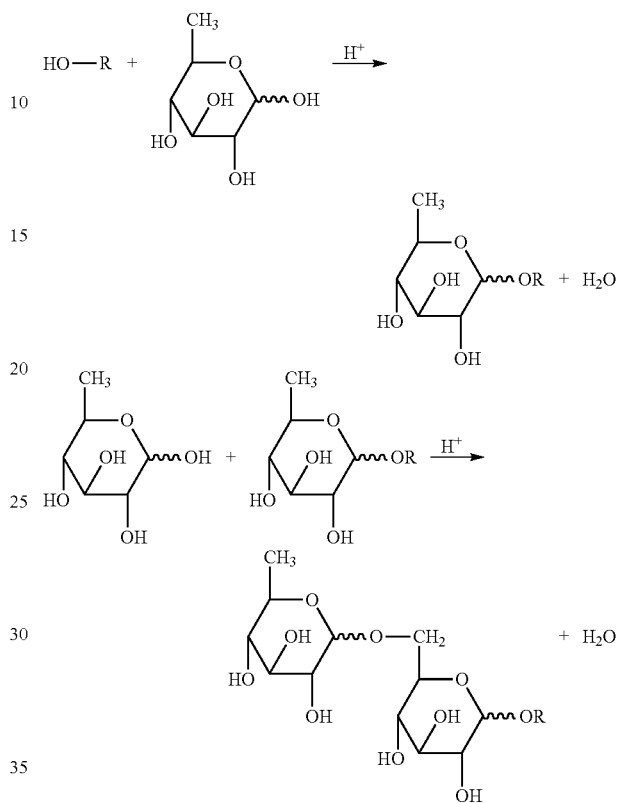

The molar ratio of alcohol to monosaccharide in the reaction mixture can vary widely but is typically between about 1.5:1 to about 10:1, and preferably between about 2.0:1 to about 6.0:1. The particular molar ratio chosen depends upon the desired average degree of polymerization (DP) of the monosaccharide reacted with the alcohol. Preferably, the ratio of alcohol to monosaccharide will be chosen to allow the production of an alkyl glycoside product having a DP between about 1.0 to about 5.0, from about 1.2 to about 3.0 in another embodiment, and from about 1.3 to about 1.8 in yet another embodiment.

The term "HLB" (Hydrophilic Lipophilic Balance) refers to the ratio of the hydrophilicity of the polar groups of the surface-active molecules to the hydrophobicity of the lipophilic part of the same molecules. An HLB value of 0 corresponds to a completely hydrophobic molecule, and a value of 20 would correspond to a molecule made up completely of hydrophilic components. Thus, depending on the alkyl chain length and the DP selected, the HLB may correspondingly vary. In a particular embodiment, the HLB value of the surfactant may range from 9.5 to 15 (and from about 11 to 14 in another embodiment) for desired cleaning action of the borehole surface and to render the borehole surface water-wet (when transitioning to a water-based fluid).

In accordance with embodiments of the present disclosure, the alkyl glycoside surfactants discussed above may be used in a base fluid comprising a blend of a base oil and at least one of a mutual solvent or a terpene (to form a stock fluid). Such base oils may include any oleaginous fluids that are substantially the same as or compatible with the oil used as the base for the drilling fluid in the borehole being treated as well as crude oils, distillate oils, fuel oils (e.g., diesel), white oils, silicone oils, mineral oils (paraffinic oils, naphthenic oils, aromatic oils), and natural oils.

Additionally, the base fluid blend may also contain at least one mutual solvent and/or a terpene, such limonene or terpinol. One example of a suitable mutual solvent may be a glycol ether or glycerol. The use of the term "mutual solvent" includes its ordinary meaning as recognized by those skilled in the art, as having solubility in both aqueous and oleaginous fluids. In some embodiments, the solvent may be substantially completely soluble in each phase while in select other embodiment, a lesser degree of solubilization may be acceptable. Illustrative examples of such solvents include for example, isopropanol, diethylene glycol monoethyl ether, dipropylene glycol monomethyl ether, tripropylene butyl ether, dipropylene glycol butyl ether, diethylene glycol butyl ether, butylcarbitol, dipropylene glycol methylether, various esters, such as ethyl lactate, propylene carbonate, butylene carbonate, etc, and pyrolidones. In a particular embodiment, the mutual solvent is ethylene glycol monobutyl ether (EGMBE). Further, in a particular embodiment, selection of a mutual solvent may depend on factors such as the type and amount of salt present in the fluid. For example, in a salt-saturated fluid calcium bromide may have greater compatibility with ethylene glycol monobutyl ether while calcium chloride may have greater compatibility with glycerol. One skilled in the art would appreciate that this difference in compatibility may result from the electronegativity difference between various salts, and the relative ability of the solvent to distribute charges. When the base fluid comprises a blend of base oil, mutual solvent, and terpene, the blend may include any ranges up to a blend of 1:2:2. In a preferred embodiment, the blend may range from 1:0.5:0.5 to 1.0:1.5:1.5. Further, when formulated with the alkyl glycoside surfactant, fluid comprises may include from about 5% to about 40% by volume of surfactant and about 60% to about 95% by volume of the base fluid. In a particular embodiment, the cleaning fluid may include about 10 to 50% by volume of a base oil, about 10 to 45% by volume of a mutual solvent, about 10 to 40% by volume of a terpene, and about 5 to 40% by volume of an alkyl glycoside.

The cleaning fluid may be incorporated or mixed into a diluting or carrier fluid, which may be an oleaginous or aqueous fluid depending on the fluid type to which the wellbore is being transitioned. For example, an aqueous fluid may be used when transitioning from an oil-based fluid to a water-based fluid to aid in transitioning to a water-wet state. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts. Additionally, brines that may be used in the pills disclosed herein may be natural or synthetic, with synthetic brines tending to be much simpler in constitution. In one embodiment, the density of the pill may be controlled by increasing the salt concentration in the brine (up to saturation). In a particular embodiment, a brine may include halide or carboxylate salts of mono- or divalent cations of metals, such as cesium, potassium, calcium, zinc, and/or sodium. Selection between types of salts used may depend, for example, largely on density requirements, but also on availability, cost, etc. Conventional surfactants used in cleaning operations are not highly compatible with a wide range of salts; however, the inventors of the present invention have found a surfactant (an alkyl glycoside) that demonstrates broad salt compatibility, allowing the cleaning fluid to be used to a broader range of wells and with a broader number of fluid systems.

Alternatively, when transitioning from one oil-based fluid to another, the cleaning fluid may be incorporated into an oleaginous diluting fluid. Such oleaginous fluids may include any of those described above as the base oil or any of those described below as a diluent oil spacer fluid.

Formulation of the cleaning fluids disclosed herein in the diluting or carrier fluid may occur by formulating a stock cleaning fluid of base fluid (base oil and mutual solvents and/or terpenes) with the alkyl glycoside. This stock cleaning fluid may then be diluted (if desired) with an aqueous or oleaginous diluting fluid such as those described above. In a particular embodiment, final formulation may include about 5-50 percent by volume stock fluid and about 50-95 percent by volume diluting fluid.

These cleaning fluids may be used to clean borehole surfaces having drilling fluid residue thereon. Drilling fluids may be water-based or oil-based fluids and often include various additives including noncolloidal solids (such as barite or other weighting agents), colloidal solids (such as clays or polymeric components), and other fluid modifying chemicals (such as solvents, surfactants, gelling agents such as lignitic materials, tannic materials, etc.). Before transitioning from one fluid to another fluid, particularly when transitioning from an oil-based fluid to a water-based fluid, cleaning of borehole surfaces to remove fluid residue may be desirable. Such cleaning may be desired on cased walls or even on filter cakes filterout out or built up on open hole walls (from filtration of the drilling fluid into the formation). On such open hole walls, a cleaning agent may be used to clean the exposed surface of the filter cake and render the exposed surface water-wettable to increase penetration of breaker fluids and breaking agents into the filtercake during subsequent displacement operations. Contact between or commingling of two different fluid types is typically avoided when the two fluids are incompatible and could result in detrimental interactions, including for example, effect on viscosity, potentially affecting downhole pressures and pumping. Such negative effects may be reduced or overcome by using spacer fluids, one of which may be the cleaning fluid of the present disclosure.

When transitioning between an oil-based drilling fluid and a water-based completion fluid, it may also be important to remove all solid particles from the wellbore so that during subsequent completion operations, the solid particles do not negatively impact or damage the formation or production equipment. To aid in the displacement of the drilling fluid and cleaning of fluid residue from the wellbore, one or more spacer fluids may be used in combination with the cleaning fluid described herein.

For example, in particular embodiments, at least one spacer fluid may be pumped into the wellbore to displace the initial fluid and at least one spacer fluid may be pumped into the wellbore to displace the cleaning fluid, prior to pumping the wellbore fluid intended for the next downhole operation (drilling, completion, etc.). Such spacer fluids may be selected based on the type of transition occurring (e.g., oil-based to water-based).

According to some embodiments, during the transition from an oil-based fluid to a water-based fluid (such as a completion fluid), the following displacements, broken into pre-cleaning agent and post-cleaning agent displacements, may occur. Prior to pumping of the cleaning agent (in the cleaning fluid), a diluent oil may be first pumped down the borehole to dilute the oil-based drilling fluid and to initiate displacement of the drilling fluid. The term "diluent oil" refers to an oleaginous fluid that is substantially the same as, or is compatible with, the oil which is used as the base for the drilling fluid in the borehole being treated, including the base oil of the drilling fluid being displaced, as well as crude oils, distillate oils, gasolines, naphthas, kerosenes, fuel oils, white oils, oils derived from coal or shale, aromatic oils, silicone oils, mineral seal oils, natural oils, terpenes, and synthetic oils.

This first spacer fluid may optionally be weighted (with conventional weighting agents) and/or viscosified. Alternatively, the first spacer fluid may be unweighted and unviscosified, and a second, separate spacer fluid that may be weighted and/or viscosified may be used. In such an instance, the second spacer fluid may also be formed with an oleaginous base fluid, including diluent oils, as well as various solvents known in the art such as glycols, ethers, alkanes, ketones, amines, alcohols, etc.

Following the first (and optional second) spacer fluid, a cleaning fluid having an alkyl glycoside contained therein may be pumped into the wellbore as described above. Following the pumping of the cleaning fluid, at least one post-cleaning agent spacer fluid may be pumped into the wellbore prior to pumping the "final" water-based fluid. As the described above, while the cleaning fluid does not leave the surface water-wet (due to the absence of an aqueous fluid in the cleaning fluid), but instead water-wettable, the post-cleaning agents spacer fluid(s) may be aqueous in nature. Thus, the one or more post-cleaning agent spacer fluid may be fresh water or a salt-containing water. Additionally, the one or more post-cleaning agents spacer fluids may optionally be weighted (with salts or solid weighting agents) and/or viscosified with polymeric materials such as gums, starches, and cellulosic materials. In a preferred embodiment, a single viscosified spacer fluid (water or brine based) may be used to displace the cleaning fluid from the wellbore, and a water-based completion fluid may be pumped into the wellbore to displace the spacer fluid prior to completion operation(s). Such a completion fluid may be a clear, solids-free brine, for example. Further, the above displacement sequence is only exemplary of the type of displacements that may occur during the transition from one fluid to another. There exists no limitation on the type and number of displacements that may occur when using the cleaning fluids of the present disclosure. Rather, it is also within the scope of the present disclosure that the cleaning fluids disclosed herein may be used in other sequences, including during displacements prior to cementing operations, and displacements with breaker fluids (to break an accumulated filter cake formed on an open hole wall). Further, during the displacement operations, one or more of the displacements may occur at a pump rate sufficient to initiate turbulent flow of the pumped fluid. One skilled in the art would appreciate that turbulent flow of a fluid may be dependent on pump rate as well as viscosity of the pumped fluid, and that when achievable, may aid in removing residue from the borehole surface. In a particular embodiment, the cleaning fluid of the present disclosure may be pumped as a turbulent fluid.

EXAMPLE

The following example is provided to further illustrate the application and the use of the methods and compositions of the present disclosure. In particular, the cleaning fluids tested various formulations of ECF-2028, an alkyl polyglucoside available from M-I L.L.C. (Houston, Tex.) in ESCAID 110 (a desulfurized hydrogenated kerosene available from Exxon Company USA (Houston, Tex.)), EGMBE, and d-limonene. Drilling mud systems included in the test include RHELIANT®, FAZEPRO™, VERSADRIL®, and VERSACLEAN®, all of which are oil-based muds available from M-I L.L.C. (Houston, Tex.). Tergitol L64, which was used as a comparative sample, is an ethylene oxide/propylene oxide copolymer available from The Dow Chemical Company (Midland, Mich. The alkyl glycoside (or comparative surfactants) was formulated with a base oil, EGMBE, and d-limonene, and this mixture was then combined with a variety of aqueous fluids (listed in the table below) in a 15:85 volume ratio (cleaning mixture:aqueous fluid).

Cleaning efficiency tests were performed on various fluid formulations for a variety of oil-based fluids with a variety of salt solutions. Conventional cleaning agents show high disparity in compatibility among different oil-based muds and salt systems. Thus, in addition to testing cleaning efficiency in a single mud/salt system combination, cleaning efficiency was tested in a number of mud/salt combinations to demonstrate broad applicability of the cleaning agents of the present disclosure.

The tests were performed with the following procedure. A carbon steel sleeve (of known weight (W1) and assembled on a multi-speed Fann 35A Rheometer) is submerged into a beaker containing 150 mL of sample oil-based mud and rotated at 3 rpm for 15 minutes. After 15 minutes, the beaker is removed from the sleeve and the excess mud is allowed to drain from the sleeve for ~1-2 minutes. The sleeve is disassembled from the Rheometer without removing mud and weighed (W2). Following weighing the sleeve, the sleeve is reassembled onto the Fann 35A and submerged into a beaker containing 150 mL of the sample cleaning fluid and rotated at 200 rpm for the particular time amount (shown in the Tables below). After the particular amount of time, the beaker is removed from the sleeve and the sleeve is allowed to drain for ~1-2 minutes. The sleeve is then disassembled from the Rheometer without removing mud and weighed (W3.1). The sleeve is assembled/disassembled further rotation in fluids to record the new weight (W3.2) at each desired time interval. The mud removal for each time interval is calculated using the following equation:

$$\text{Removal}(\%) = \left(1 - \frac{W3 \cdot n - W1}{W2 - W1}\right) * 100\%$$

The results of the cleaning efficiency tests are shown in Tables 1A-C below.

TABLE 1A

| | Sample No. | | | | | |
|---|---|---|---|---|---|---|
| | 1 | 2 | 3 | 4 | 5 | 6 |
| Aqueous Fluid (85%) | Seawater | 14.2 ppg CaBr$_2$ | 13.0 ppg CaBr$_2$ | 11.6 ppg CaCl$_2$ | 10.0 ppg NaCl | Seawater |
| Stock Fluid (15%) | | | | | | |
| ESCAID 110 | 25% | 25% | 25% | 25% | 25% | 40.0% |
| EGMBE | 25% | 25% | 25% | 25% | 25% | 25.0% |
| d-limonene | 25% | 25% | 25% | 25% | 25% | 25.0% |
| ECF-2028 | 25% | 25% | 25% | 25% | 25% | 10.0% |
| Fluid pH | 8.2 | 5.5 | 2.7 | 3.5 | 5.8 | |
| Mud Type | RHELIANT | RHELIANT | RHELIANT | RHELIANT | RHELIANT | RHELIANT |
| Mud Density | 14.5 | 14.5 | 14.5 | 14.5 | 14.5 | 14.5 |
| Percent Mud Removed | | | | | | |
| 1 min | — | — | — | — | — | 76.5% |
| 2 min | — | — | — | — | — | 100% |
| 3 min | 60.8% | 100% | 100% | 100% | 88.0% | — |
| 4 min | — | — | — | — | — | — |
| 5 min | — | — | — | — | — | — |
| 6 min | 100% | — | — | — | 100% | — |
| 10 min | — | — | — | — | — | — |

TABLE 1B

| | Sample No. | | | | | |
|---|---|---|---|---|---|---|
| | 7 | 8 | 9 | 10 | 11 | 12 |
| Aqueous Fluid (85%) | Seawater | Seawater | Seawater | 14.2 ppg CaBr$_2$ | Seawater | 10.0 ppg NaCl |
| Stock Fluid (15%) | | | | | | |
| ESCAID 110 | 40.0% | 40.0% | 25% | 25% | 25% | 25% |
| EGMBE | 20.0% | 20.0% | 25% | 25% | 25% | 25% |
| d-limonene | 30.0% | 25.0% | 25% | 25% | 25% | 25% |
| ECF-2028 | 10.0% | 15.0% | 25% | 25% | 25% | 25% |
| Mud Type | RHELIANT | RHELIANT | FAZEPRO | FAZEPRO | VERSADRIL | VERSADRIL |
| Mud Density | 14.5 | 14.5 | 10.8 | 10.8 | 17.0 | 17.0 |
| Percent Mud Removed | | | | | | |
| 1 min | 75.0% | 61.4% | 17.9% | 5.0% | 54.4% | 86.3% |
| 2 min | 100% | 100% | 735.% | 23.5% | 91.1% | 80.8% |
| 3 min | — | — | 87.4% | 77.9% | 100.0% | 100.0% |
| 4 min | — | — | 100.0% | 95.0% | — | — |
| 5 min | — | — | — | 100.0% | — | — |
| 6 min | — | — | — | — | — | — |
| 10 min | — | — | — | — | — | — |

TABLE 1C

| | Sample No. | | | | |
|---|---|---|---|---|---|
| | 13 | 14 | 15 | 16 | Comp 1 |
| Aqueous Fluid (%) | 11.6 ppg CaCl$_2$ | 14.2 ppg CaBr$_2$ | Seawater | Seawater | Seawater |
| Stock Fluid (15%) | | | | | |
| ESCAID 110 | 25% | 25% | 25% | 25% | 25% |
| EGMBE | 25% | 25% | 25% | 25% | 25% |
| d-limonene | 25% | 25% | 25% | 25% | 25% |
| ECF-2028 | 25% | 25% | 25% | 25% | — |
| Tergitol L64 | — | — | — | — | 25% |
| Mud Type | VERSADRIL | VERSADRIL | VERSACLEAN | VERSACLEAN | RHELIANT |
| Mud Density | 17.0 | 17.0 | 9.7 | 9.7 | 14.5 |
| 1 min | 79.5% | 100.0% | 0.0% | 26.9% | |
| 2 min | 100.0% | — | 23.9% | 49.3% | |
| 3 min | — | — | 46.5% | 100.0% | 29.3% |
| 4 min | — | — | 69.0% | — | — |

TABLE 1C-continued

| | Sample No. | | | | |
|---|---|---|---|---|---|
| | 13 | 14 | 15 | 16 | Comp 1 |
| 5 min | — | — | 100.0% | — | — |
| 6 min | — | — | — | — | 53.7% |
| 10 min | — | — | — | — | 74.4% |

Embodiments of the present disclosure may advantageously provide for at least one of the following: Conventional fluids used in cleaning operations are not highly efficient or compatible with a wide range of salts or drilling fluid systems. The fluids of the present disclosure have discovered that the use of an alkyl glycoside in a cleaning fluid that includes a base oil may provide for highly efficient cleaning as well as possess broad salt and drilling fluid compatibility, allowing the cleaning fluid to be used to a broader range of wells and with a broader number of fluid systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of cleaning walls of a wellbore, comprising:
   contacting the walls with a cleaning fluid, the cleaning fluid comprising:
      a base fluid comprising a blend of a base oil and at least one of a mutual solvent or a terpene; and
      an alkyl glycoside,
   wherein the cleaning fluid is blended with a diluting fluid comprising an aqueous fluid or an oleaginous fluid.

2. The method of claim 1, wherein the alkyl glycoside has an HLB of about 9 to about 15.

3. The method of claim 1, wherein the alkyl glycoside has the formula RO—(R'O)$_x$Z$_y$ where the letter O represents an oxygen atom; R represents a monovalent alkyl radical containing from 8 to 16 carbon atoms; R' represents a divalent alkyl radical containing 2 to 4 carbon atoms; x represents the number of oxy-alkylene units in the alkyl glycoside varying from 0 to about 12; Z represents a saccharide moiety containing 5 or 6 carbon atoms, and y represents the number of saccharide units in the glycoside.

4. The method of claim 3, wherein y ranges from 1.3 to 1.8.

5. The method of claim 1, wherein the base oil comprises mineral oil or diesel.

6. The method of claim 1, wherein the mutual solvent comprises at least one compound selected from the group consisting of ethylene glycol, ethylene glycol monobutyl ether, and butyl carbitol.

7. The method of claim 1, wherein the cleaning fluid comprises from about 5% to about 40% of alkyl glycoside and about 60% to about 95% of the base fluid.

8. The method of claim 7, wherein cleaning fluid comprises from 10 to 50% by volume of a base oil, about 10 to 45% by volume of a mutual solvent, about 10 to 40% by volume of a terpene, and about 5 to 40% by volume of an alkyl glycoside.

9. The method of claim 1, wherein the cleaning fluid and diluting fluid are mixed about to 50 percent by volume cleaning fluid and about 50 to 95 percent by volume diluting fluid.

10. A method of cleaning a casing in a wellbore having an oil-based fluid contained therein, comprising:
    injecting diesel to displace the oil-based fluid;
    injecting a weighted spacer fluid to displace the diesel;
    injecting a cleaning fluid to displace the weighted spacer fluid, the cleaning fluid comprising:
       a base fluid comprising a blend of a base oil and at least one of a mutual solvent or a terpene; and
       a surfactant at least one alkyl glycoside; and
    injecting a brine to displace the cleaning fluid.

11. The method of claim 10, wherein the brine has at least one viscosifier contained therein.

12. The method of claim 10, wherein the injecting the cleaning fluid comprises injecting the cleaning fluid at a rate sufficient to cause turbulent flow.

13. The method of claim 10, wherein at least one injecting step comprises injecting at a rate sufficient to cause turbulent flow.

14. The method of claim 10, wherein the surfactant has an HLB of about 9 to about 15.

15. The method of claim 10, wherein the alkyl glycoside has the formula RO—(R'O)$_x$Z$_y$ where the letter O represents an oxygen atom; R represents a monovalent alkyl radical containing from 8 to 16 carbon atoms; R' represents a divalent alkyl radical containing 2 to 4 carbon atoms; x represents the number of oxy-alkylene units in the alkyl glycoside varying from 0 to about 12; Z represents a saccharide moiety containing 5 or 6 carbon atoms, and y represents the number of saccharide units in the glycoside.

16. The method of claim 15, wherein y ranges from 1.3 to 1.8.

17. The method of claim 10, wherein the base oil comprises mineral oil or diesel.

18. The method of claim 10, wherein the mutual solvent comprises at least one compound selected from the group consisting of ethylene glycol, ethylene glycol monobutyl ether, and butyl carbitol.

19. The method of claim 10, wherein the cleaning fluid comprises from about 5% to about 40% of alkyl glycoside and about 60% to about 95% of the base fluid.

20. The method of claim 19, wherein cleaning fluid comprises from 10 to 50% by volume of a base oil, about 10 to 45% by volume of a mutual solvent, about 10 to 40% by volume of a terpene, and about 5 to 40% by volume of an alkyl glycoside.

21. The method of claim 10, wherein the cleaning fluid is blended with a diluting fluid comprising an aqueous fluid or an oleaginous fluid.

22. The method of claim 21, wherein the cleaning fluid and diluting fluid are mixed about 5 to 50 percent by volume cleaning fluid and about 50 to 95 percent by volume diluting fluid.

* * * * *

UNITED STATES PATENT AND TRADEMARK OFFICE
CERTIFICATE OF CORRECTION

PATENT NO.        : 8,584,760 B2  
APPLICATION NO.   : 13/144002  
DATED             : November 19, 2013  
INVENTOR(S)       : Arvie, Jr. et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this
Seventh Day of April, 2015

Michelle K. Lee
*Director of the United States Patent and Trademark Office*